(12) United States Patent
Kano (10) Patent No.: US 10,154,164 B2
(45) Date of Patent: Dec. 11, 2018

(54) IMAGING OPTICAL SYSTEM AND READING APPARATUS INCLUDING THE SAME

(71) Applicant: CANON KABUSHIKI KAISHA, Tokyo (JP)

(72) Inventor: Hiroto Kano, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 130 days.

(21) Appl. No.: 15/095,658

(22) Filed: Apr. 11, 2016

(65) Prior Publication Data
US 2016/0323467 A1 Nov. 3, 2016

(30) Foreign Application Priority Data
Apr. 30, 2015 (JP) .................. 2015-092897

(51) Int. Cl.
*G02B 17/00* (2006.01)
*H04N 1/00* (2006.01)
(Continued)

(52) U.S. Cl.
CPC ......... *H04N 1/00795* (2013.01); *G02B 13/18* (2013.01); *G02B 17/0852* (2013.01);
(Continued)

(58) Field of Classification Search
CPC .. G02B 13/0065; G02B 13/009; G02B 15/14; G02B 17/00; G02B 21/00; G02B 23/00;
(Continued)

(56) References Cited

U.S. PATENT DOCUMENTS

| 5,227,896 A | * | 7/1993 | Ozawa | .................. H04N 1/195 358/471 |
| 5,585,926 A | * | 12/1996 | Fujii | .................... G06T 3/0031 358/471 |

(Continued)

FOREIGN PATENT DOCUMENTS

| JP | 2013-044993 A | 3/2013 |
| JP | 2014-098750 A | 5/2014 |

*Primary Examiner* — William R Alexander
*Assistant Examiner* — Balram Parbadia
(74) *Attorney, Agent, or Firm* — Carter, DeLuca, Farrell & Schmidt, LLP

(57) ABSTRACT

Provided is a reading apparatus of the present invention, including: an image pickup element configured to pick up an image of an object; a first optical system including at least one reflection surface configured to reflect a light flux from the object, the first optical system being configured to form an intermediate image of the object; and a second optical system configured to image the intermediate image onto a light-receiving surface of the image pickup element, in which: the at least one reflection surface includes a first reflection surface which is closest to the light-receiving surface on an optical path, and which has a positive power; and the following condition is satisfied:

$5 \leq TD/IML \leq 20$ where TD represents a maximum distance from the first reflection surface to the light-receiving surface on the optical path, and IML represents a maximum image height of the second optical system.

17 Claims, 8 Drawing Sheets

(51) Int. Cl.
*H04N 5/225* (2006.01)
*G02B 17/08* (2006.01)
*G02B 13/18* (2006.01)

(52) U.S. Cl.
CPC ......... *H04N 5/2254* (2013.01); *H04N 5/2256* (2013.01); *H04N 2201/0081* (2013.01)

(58) Field of Classification Search
CPC ............... H04N 1/00681; H04N 1/193; H04N 2201/0434; H04N 1/00795; G06K 7/10712; G06K 7/10831
See application file for complete search history.

(56) References Cited

U.S. PATENT DOCUMENTS

| | | | | |
|---|---|---|---|---|
| 5,805,272 | A * | 9/1998 | Nozawa | H04N 1/00681 355/25 |
| 6,188,492 | B1 * | 2/2001 | Bungo | H04N 1/00681 358/474 |
| 6,339,508 | B1 * | 1/2002 | Nozawa | G02B 9/34 359/686 |
| 6,898,023 | B2 * | 5/2005 | Takeuchi | G02B 13/0045 359/676 |
| 6,980,369 | B2 * | 12/2005 | Ishikawa | G02B 15/177 359/676 |
| 6,985,305 | B2 * | 1/2006 | Takeuchi | G02B 13/002 359/676 |
| 2001/0038446 | A1 * | 11/2001 | Takahashi | G03F 7/70225 355/67 |
| 2002/0176175 | A1 * | 11/2002 | Kamo | G02B 17/0848 359/645 |
| 2003/0179464 | A1 * | 9/2003 | Amanai | G02B 15/177 359/685 |
| 2004/0125463 | A1 * | 7/2004 | Takeuchi | G02B 13/0045 359/689 |
| 2006/0109558 | A1 * | 5/2006 | Nishioka | G02B 1/007 359/642 |
| 2007/0024739 | A1 * | 2/2007 | Konno | G02B 5/04 348/337 |
| 2007/0115560 | A1 * | 5/2007 | Kushida | G02B 15/173 359/687 |
| 2008/0130128 | A1 * | 6/2008 | Yamashita | G02B 13/06 359/649 |
| 2008/0259454 | A1 * | 10/2008 | Nanba | G02B 15/173 359/557 |
| 2008/0278824 | A1 * | 11/2008 | Shirota | G02B 13/16 359/684 |
| 2010/0097582 | A1 | 4/2010 | Nagase et al. | |
| 2010/0181378 | A1 * | 7/2010 | Hayakawa | A47J 31/3623 235/454 |
| 2010/0214664 | A1 * | 8/2010 | Chia | G02B 13/004 359/677 |
| 2011/0157430 | A1 * | 6/2011 | Hosoya | G02B 13/0065 348/240.3 |
| 2013/0286276 | A1 * | 10/2013 | Kawamura | G02B 15/14 348/345 |
| 2014/0022417 | A1 * | 1/2014 | Yokoyama | G02B 15/173 348/240.99 |
| 2014/0063604 | A1 * | 3/2014 | Wada | G02B 15/14 359/557 |

\* cited by examiner

IMAGING OPTICAL SYSTEM AND READING APPARATUS INCLUDING THE SAME

BACKGROUND OF THE INVENTION

Field of the Invention

The present invention relates to an imaging optical system and a reading apparatus including the same, and more particularly, to a reading apparatus capable of conducting reading with high resolution even in a compact size and an imaging optical system included in the reading apparatus.

Description of the Related Art

Hitherto, there has been known a reading apparatus configured to read an object from above.

In U.S. Patent Application Publication No. 2010/0097582, there is disclosed a reading apparatus including a curved mirror and a plurality of lenses.

Further, in U.S. Patent Application Publication No. 2010/0097582, in order to enable the reading apparatus to conduct reading with high resolution even in a compact size, a ratio between a distance from a curved mirror surface arranged closest to the object side to an image pickup element surface and a distance from an optical axis of a plurality of lenses to an edge part of the image pickup element surface which is farthest from the optical axis is defined in an optical system included in the reading apparatus.

However, in U.S. Patent Application Publication No. 2010/0097582, the above-mentioned ratio is set to be larger than 20. Therefore, when a large-sized image pickup element is used for the reading apparatus disclosed in U.S. Patent Application Publication No. 2010/0097582, the entire length of the optical system needs to be increased, and hence there arises a demand for an increase in size of the reading apparatus.

SUMMARY OF THE INVENTION

Therefore, the present invention has an object to provide a reading apparatus capable of conducting reading with high resolution even in a compact size even when a large-sized image pickup element is used and an imaging optical system included in the reading apparatus.

According to one embodiment of the present invention, there is provided a reading apparatus, including: an image pickup element configured to pick up an image of an object; a first optical system including at least one reflection surface configured to reflect a light flux from the object, the first optical system being configured to form an intermediate image of the object; and a second optical system configured to image the intermediate image onto a light-receiving surface of the image pickup element, in which: the at least one reflection surface includes a first reflection surface which is closest to the light-receiving surface on an optical path, and which has a positive power; and the following condition is satisfied:

$$5 \leq TD/IML \leq 20$$

where TD represents a maximum distance from the first reflection surface to the light-receiving surface on the optical path, and IML represents a maximum image height of the second optical system.

Further features of the present invention will become apparent from the following description of exemplary embodiments with reference to the attached drawings.

DESCRIPTION OF THE EMBODIMENTS

An imaging optical system according to one embodiment of the present invention is described in the following with reference to the attached drawings. Note that, for the sake of easy understanding of the present invention, the drawings referred to in the following description are not necessarily drawn to scale.

Figure 1:
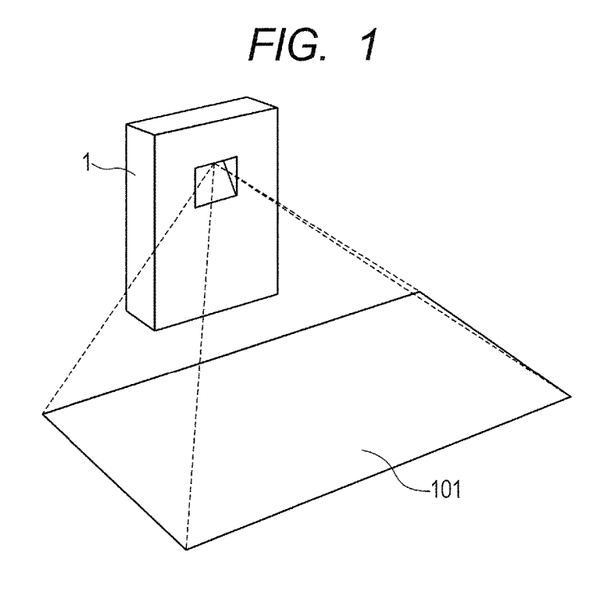
FIG. 1 is a schematic perspective view of a reading apparatus according to a first embodiment of the present invention.
Figure 2:
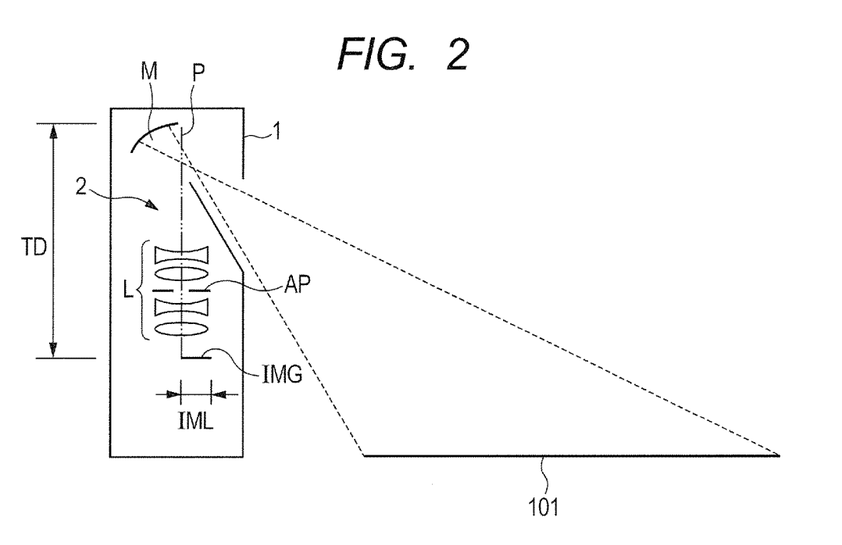
FIG. 2 is a schematic sectional view of the reading apparatus according to the first embodiment.

FIG. 1 is a schematic perspective view for illustrating a reading apparatus 1 according to a first embodiment of the present invention. FIG. 2 is a schematic sectional view for illustrating the reading apparatus 1 according to the first embodiment.

The reading apparatus 1 stores an imaging optical system 2 and an image pickup element in the inside.

The imaging optical system 2 includes a mirror (first reflective optical element or first optical system) M having a positive power and an optical system (second optical system) L.

The optical system L includes a plurality of lenses and an aperture stop AP.

An object (not shown) is placed on a reading surface 101, and a light flux from the object is reflected by the mirror M. The reflected light flux is imaged onto a light-receiving surface of the image pickup element arranged at the position of the image plane IMG by the optical system L.

As the image pickup element, a charge coupled device (CCD) sensor, a complementary metal oxide semiconductor (CMOS) sensor, or the like can be used.

The image pickup element used in this embodiment is a large-sized image pickup element having a size equal to or larger than a 1 inch type size ((13.2 mm)×(8.8 mm)).

The optical system L according to this embodiment includes a common optical axis P as indicated by the two-dot chain line in FIG. 2.

In this case, assuming that a distance (entire optical length) between an intersection point between the mirror M and the optical axis P and an intersection point between the image plane IMG and the optical axis P is TD, and that a distance between the intersection point between the image plane IMG and the optical axis P and the position of a maximum image height on the image plane IMG is IML, the imaging optical system 2 used in this embodiment is characterized by satisfying Conditional Expression (1) described below.

$$5 \leq TD/IML \leq 20 \quad (1)$$

In other words, TD represents a maximum distance from the optical surface (reflection surface) of the mirror M to a plane including the image plane IMG, and IML represents the maximum image height of the optical system L.

In this case, the mirror M and the image pickup element arranged so that the light-receiving surface is located at the position of the image plane IMG do not necessarily need to exist on the optical axis P of the optical system (imaging optical system) L. In that case, it is assumed that the distance (entire optical length) TD described above is defined by a distance from a plane including the light-receiving surface to a point farthest from the plane among points on the mirror M. Further, it is assumed that the distance IML is defined by a distance from the optical axis P to the position of the maximum image height on the image plane IMG.

Conditional Expression (1) relates to the size of the imaging optical system 2 housed in the reading apparatus 1. When TD/IML exceeds the upper limit value of Conditional Expression (1), the entire optical length of the imaging optical system 2 becomes too long.

Specifically, for example, when an image pickup element having the APS-C size ((23.4 mm)×(16.7 mm)) is used as the image pickup element, IML becomes equal to or longer than 20 mm. In that case, when the imaging optical system is designed so that TD/IML exceeds the upper limit of Conditional Expression (1), the entire optical length of the imaging optical system 2 becomes equal to or longer than 400 mm. This causes the reading apparatus 1 to become large-sized, and gives a user a sense of oppression.

On the other hand, when TD/IML falls below the lower limit value of Conditional Expression (1), a limitation is imposed on the number of lenses that can be provided in the optical system L in order to shorten the entire optical length of the imaging optical system 2. Therefore, the optical system L cannot sufficiently correct an aberration, and deterioration in the resolution of the reading apparatus 1 or the like is caused.

Further, as described above, the image pickup element used in this embodiment is a large-sized image pickup element having a size equal to or larger than the 1 inch type size ((13.2 mm)×(8.8 mm)), and hence IML is equal to or longer than 14 mm in this embodiment.

As described above, the plurality of lenses provided in the optical system L according to this embodiment are arranged so as to all share a common optical axis. However, a part of the plurality of lenses may be arranged so as to be decentered in order to correct various aberrations satisfactorily. In that case, the plurality of lenses provided in the optical system L have a plurality of optical axes, but as the optical axis used for defining TD and IML, the common optical axis shared by the most lenses among the plurality of optical axes is used.

Further, the number of mirrors M is not necessarily one, and a plurality of mirrors M may be provided. In that case, TD is defined as a distance between the intersection point between the image plane IMG and the optical axis P and an intersection point between the optical axis P and a mirror arranged closest to the image plane IMG on an optical path among the plurality of mirrors.

Of the plurality of lenses provided in the optical system L according to this embodiment, a negative lens closest to the mirror M is an aspherical lens. In this case, assuming that the maximum value of an aspherical amount of a lens surface of the negative lens on the mirror M side is $Qr_1$, and that the maximum value of the aspherical amount of a lens surface of the negative lens on the image plane IMG side is $Qr_2$, the imaging optical system 2 used in this embodiment is characterized by satisfying Conditional Expression (2) described below.

$$-2.0 < Qr_1/Qr_2 < 0 \quad (2)$$

Now, the definition of the aspherical amount of the lens surface is described with reference to FIG. 3.

Figure 3:
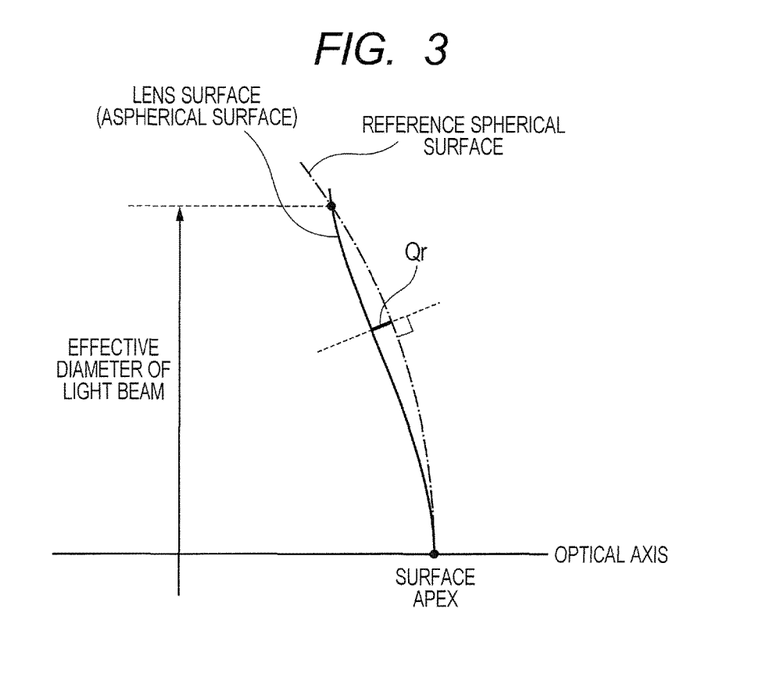
FIG. 3 is a schematic diagram for showing an aspherical amount of a lens surface.

FIG. 3 is a schematic diagram for showing the aspherical amount of the lens surface.

First, as shown in FIG. 3, a consideration is given to a reference spherical surface that passes through a surface apex on an aspherical lens surface and a point on an effective diameter of a light beam. That is, a curvature radius of the reference spherical surface is determined by the surface apex of the aspherical lens surface and the position of the effective diameter of the light beam. In this case, the effective diameter of the light beam can be calculated through use of an imaging magnification of the lens, an F-number, the image height, and the like.

Next, in consideration of a distance between the reference spherical surface and the aspherical lens surface, a distance between most spaced apart positions of the reference spherical surface and the aspherical lens surface along a direction normal to the reference spherical surface is defined as the maximum value Qr of the aspherical amount.

Note that, when the reference spherical surface exists on the center side of the reference spherical surface with respect to the aspherical lens surface within the distance between the most spaced apart positions, the maximum value Qr of the aspherical amount is defined as a positive value. On the other hand, when the aspherical lens surface exists on the center side of the reference spherical surface with respect to the reference spherical surface within the distance between the most spaced apart positions, the maximum value Qr of the aspherical amount is defined as a negative value.

In a normal case, the refractive power of the mirror M needs to be strengthened in order to make the imaging optical system 2 compact. However, the strengthening of the refractive power of the mirror M causes various aberrations including a field curvature aberration and an astigmatism to occur to a large extent. Therefore, in order to correct such various aberrations satisfactorily, it is conceivable to increase in number the plurality of lenses provided in the optical system L.

However, in this embodiment, the imaging optical system 2 is designed so that the maximum values $Qr_1$ and $Qr_2$ of the aspherical amount of a negative aspherical lens closest to the mirror M among the plurality of lenses provided in the optical system L satisfy Conditional Expression (2). This allows various aberrations to be corrected satisfactorily with a small number of lenses.

That is, when $Qr_1/Qr_2$ exceeds the upper limit value or the lower limit value of Conditional Expression (2), the reading apparatus becomes large-sized due to the entire optical length becoming long, and the deterioration in the resolution occurs due to the inability to correct various aberrations satisfactorily.

Note that, the imaging optical system 2 can correct various aberrations more satisfactorily by designing the imaging optical system 2 so as to satisfy Conditional Expression (2a) described below in place of Conditional Expression (2).

$$-1.8 < Qr_1/Qr_2 < -0.4 \quad (2a)$$

Further, the addition of the condition $Qr_1 < 0$ allows the imaging optical system 2 to correct various aberrations more satisfactorily.

Further, the imaging optical system 2 according to this embodiment is characterized by satisfying Conditional Expression (3) described below when the maximum value of an angle formed between the light flux entering the image plane IMG and the normal to the image plane IMG within an imaging region of the image plane IMG is set as ω.

$$5° \leq \omega \leq 30° \quad (3)$$

When ω falls below the lower limit value of Conditional Expression (3), various aberrations are liable to occur to a large extent. Therefore, in order to correct various aberrations satisfactorily, it is necessary to increase in number the plurality of lenses provided in the optical system L, with the result that the entire optical length becomes long.

On the other hand, when ω exceeds the upper limit value of Conditional Expression (3), light is not sufficiently gathered onto the light-receiving surface of the image pickup element arranged at the position of the image plane IMG, and the periphery of the light-receiving surface of the image pickup element becomes dark. In addition, influence of the oblique incidence of the light onto the light-receiving surface of the image pickup element becomes large, and hence the resolution decreases in the periphery of the light-receiving surface of the image pickup element.

Figure 4:
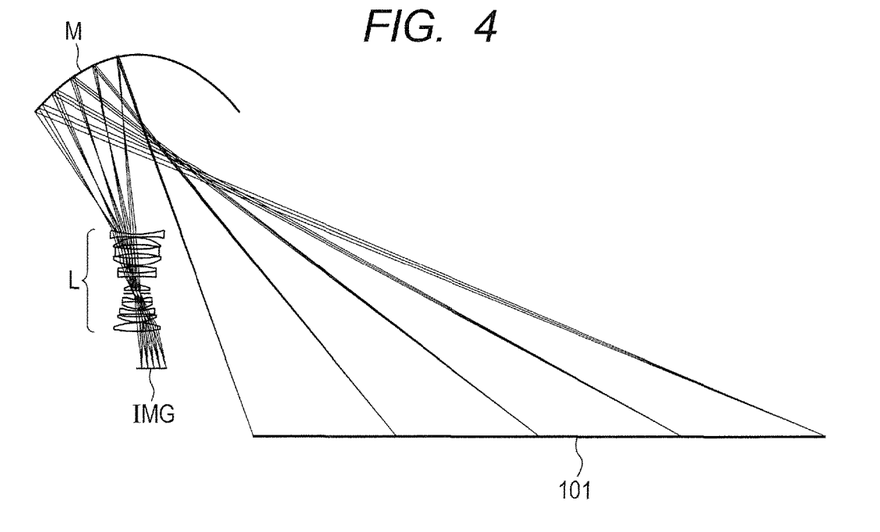
FIG. 4 is a diagram for illustrating a state in which a light flux from a reading surface of the reading apparatus including an imaging optical system according to Numerical Example 1 is condensed onto an image plane.
Figure 5:
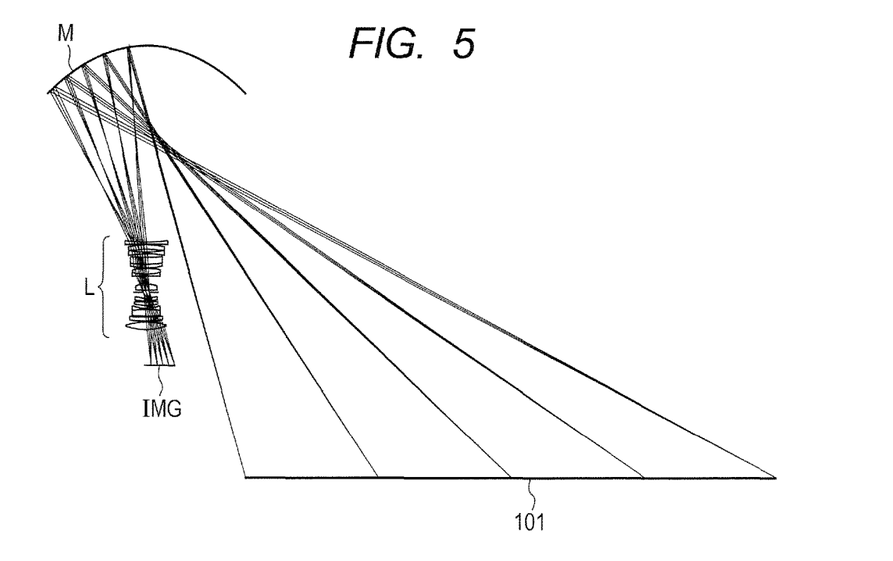
FIG. 5 is a diagram for illustrating a state in which a light flux from the reading surface of the reading apparatus including an imaging optical system according to Numerical Example 2 is condensed onto the image plane.
Figure 6:
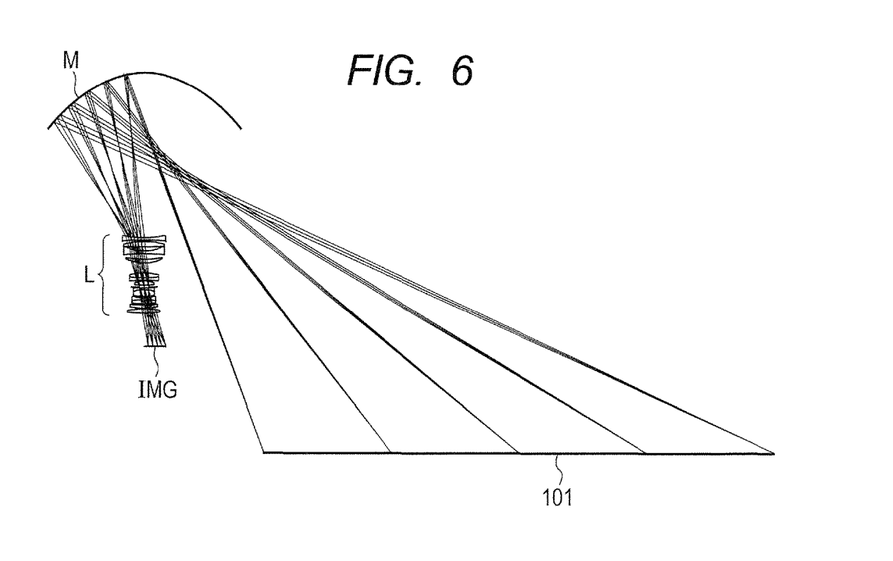
FIG. 6 is a diagram for illustrating a state in which a light flux from the reading surface of the reading apparatus including an imaging optical system according to Numerical Example 3 is condensed onto the image plane.

As illustrated in FIG. 4, FIG. 5, and FIG. 6 (details of FIG. 4, FIG. 5, and FIG. 6 are described later), the imaging optical system 2 according to this embodiment is designed so that an intermediate image is formed between the mirror M and the optical system L. That is, the mirror M forms the intermediate image of the object, and the optical system L again images the intermediate image. This allows the mirror M and the lens diameters of the plurality of lenses provided in the optical system L to have a compact size.

Further, the mirror M is designed so as to have a positive power. This allows the imaging optical system 2 to correct a distortion satisfactorily.

In addition, the reflection surface of the mirror M is an aspherical surface. This allows the imaging optical system 2 to correct various aberrations more satisfactorily.

Further, the F-number of the imaging optical system 2 (the synthetic F-number of the first optical system and the second optical system) according to this embodiment on an image side is larger than 4.0. This allows the imaging optical system 2 to sufficiently correct various aberrations even when the plurality of lenses provided in the optical system L are decreased in number. Therefore, the imaging optical system 2 can conduct the reading with high resolution across the entire region even in a compact size.

Next, the imaging optical system 2 according to Numerical Examples 1 to 3 of the present invention is described.

FIG. 4, FIG. 5, and FIG. 6 are diagrams for illustrating a state in which a light flux from the reading surface 101 of the reading apparatus 1 including the imaging optical system 2 according to Numerical Example 1, Numerical Example 2, and Numerical Example 3, respectively, is condensed onto the image plane IMG.

Figure 7:
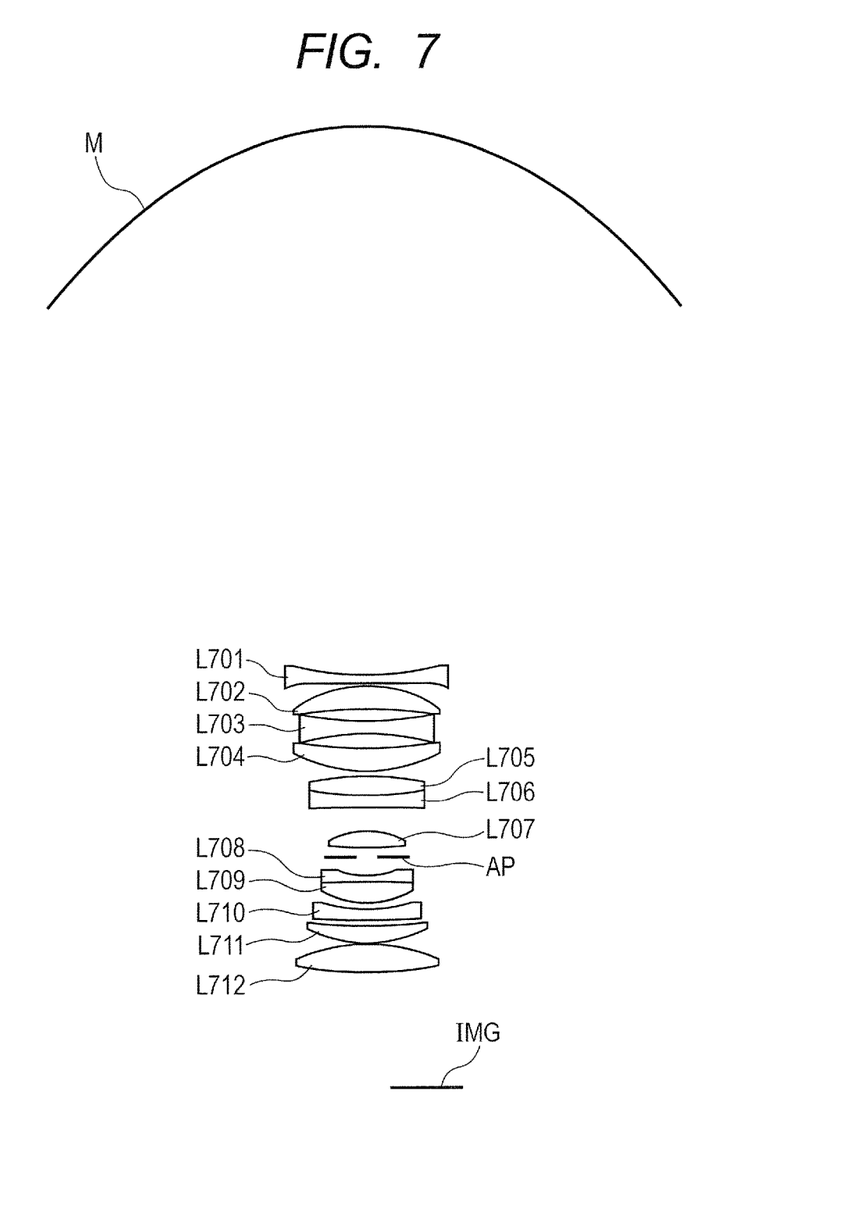
FIG. 7 is an enlarged sectional view of the imaging optical system according to Numerical Example 1.
Figure 8:
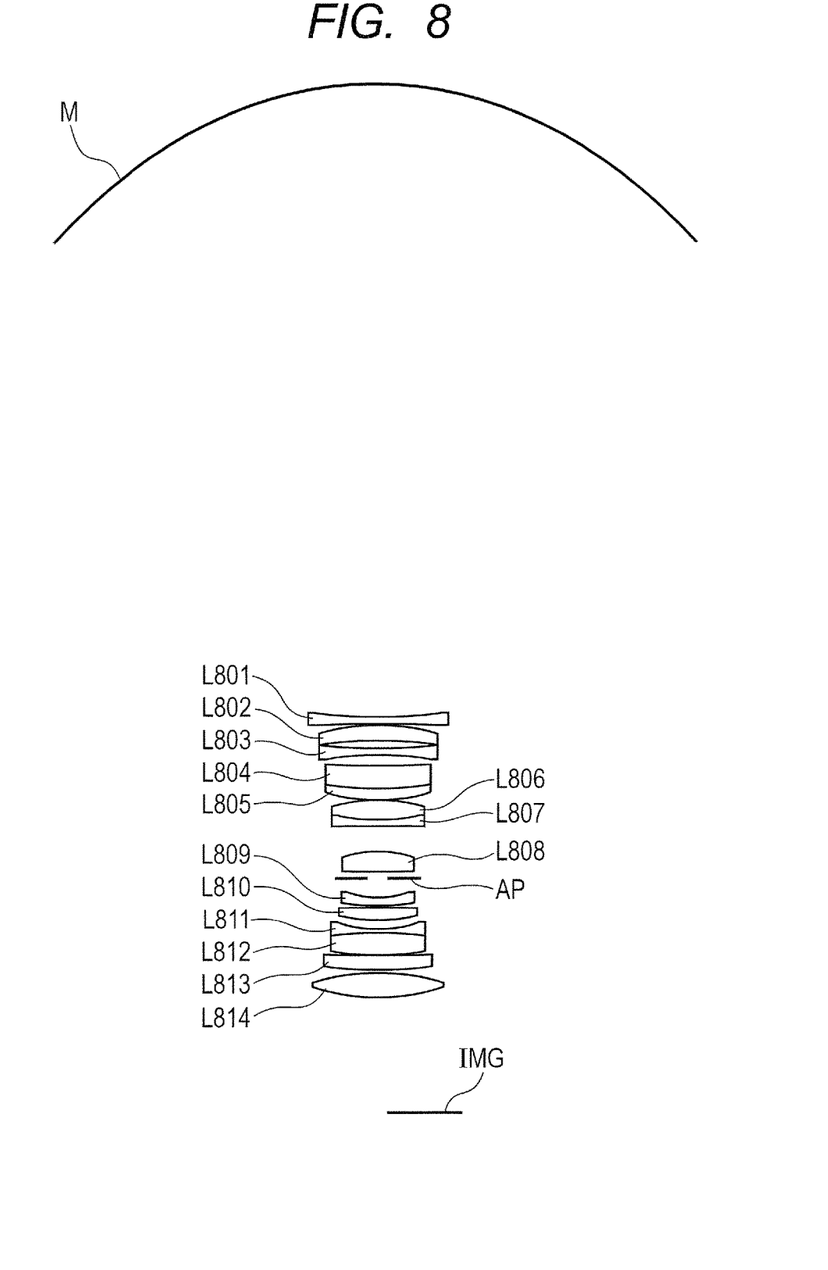
FIG. 8 is an enlarged sectional view of the imaging optical system according to Numerical Example 2.
Figure 9:
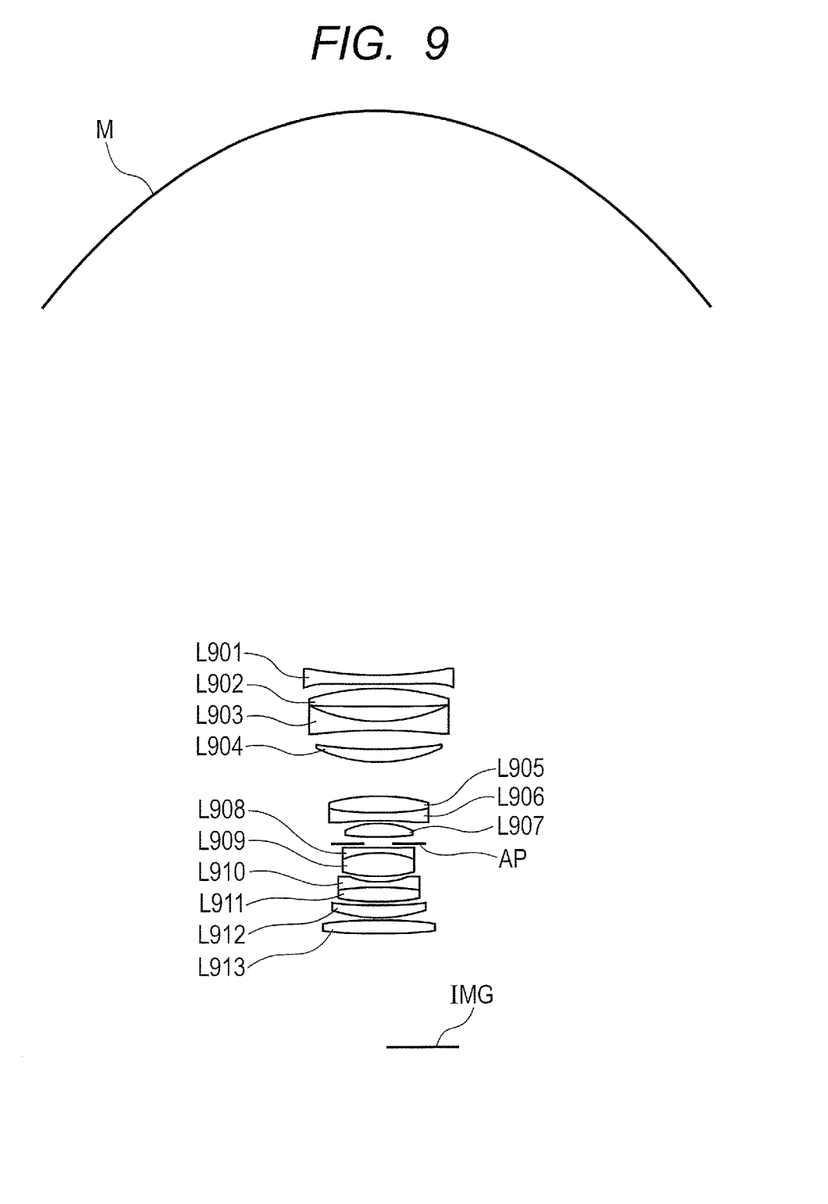
FIG. 9 is an enlarged sectional view of the imaging optical system according to Numerical Example 3.

FIG. 7, FIG. 8, and FIG. 9 are enlarged sectional views of the imaging optical system 2 according to Numerical Example 1, Numerical Example 2, and Numerical Example 3, respectively.

As illustrated in FIG. 7, the optical system L of the imaging optical system 2 according to Numerical Example 1 includes a plurality of lenses L701 to L712 and the aperture stop AP.

As illustrated in FIG. 8, the optical system L of the imaging optical system 2 according to Numerical Example 2 includes a plurality of lenses L801 to L814 and the aperture stop AP.

As illustrated in FIG. 9, the optical system L of the imaging optical system 2 according to Numerical Example 3 includes a plurality of lenses L901 to L913 and the aperture stop AP.

Figure 10:
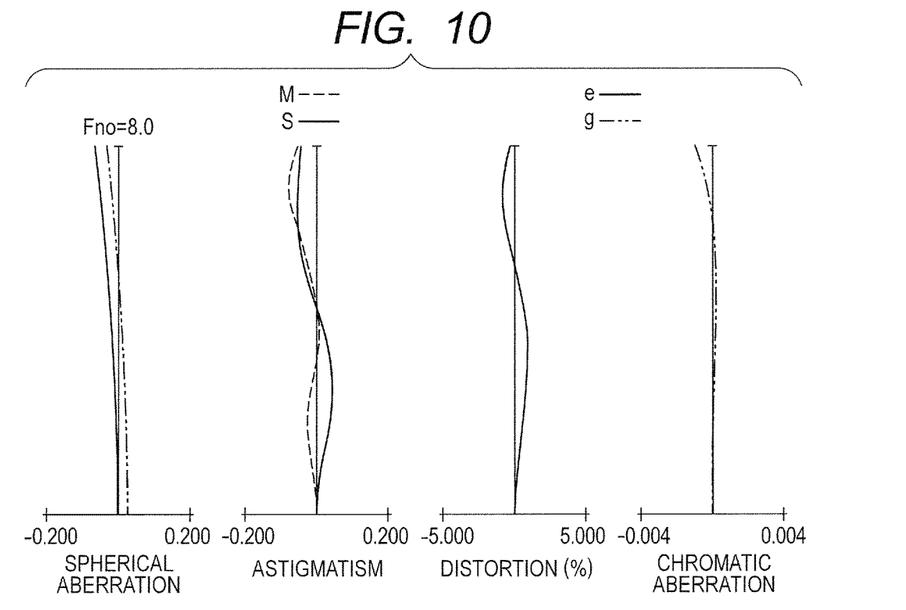
FIG. 10 is aberration diagrams of the imaging optical system according to Numerical Example 1.
Figure 11:
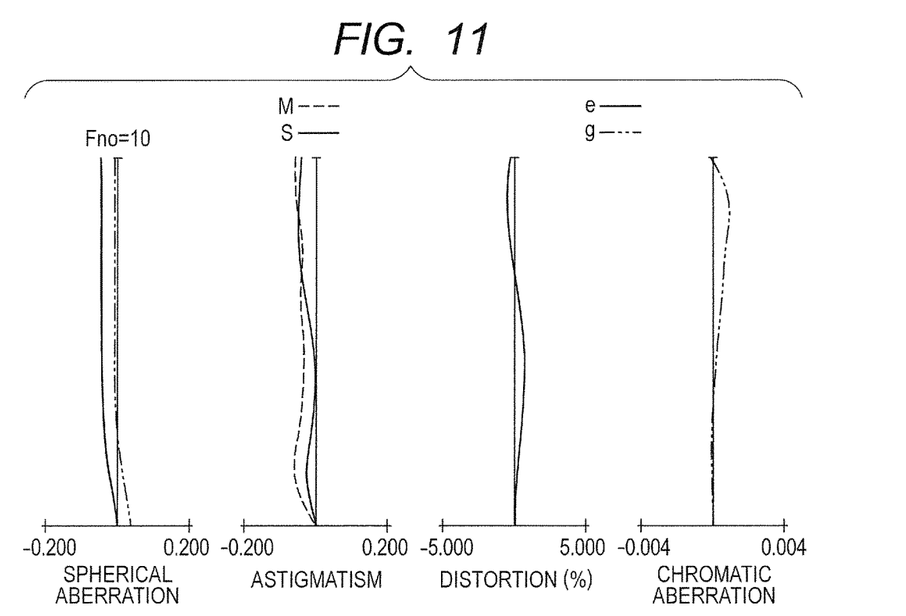
FIG. 11 is aberration diagrams of the imaging optical system according to Numerical Example 2.
Figure 12:
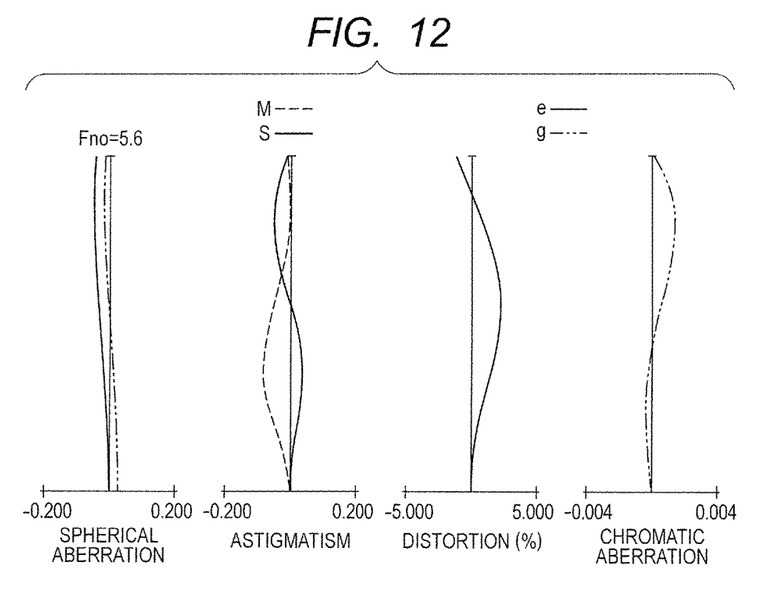
FIG. 12 is aberration diagrams of the imaging optical system according to Numerical Example 3.

FIG. 10, FIG. 11, and FIG. 12 are aberration diagrams for showing the imaging optical system 2 according to Numerical Example 1, Numerical Example 2, and Numerical Example 3, respectively. In this case, the solid line in a spherical aberration diagram indicates a spherical aberration in an e-line, and the two-dot chain line indicates a spherical aberration in a g-line. Further, the solid line in an astigmatism diagram indicates an astigmatism in a sagittal direction, and the broken line indicates an astigmatism in a meridional direction. In addition, the two-dot chain line in a chromatic aberration diagram indicates the chromatic aberration in the g-line.

In the following, numerical data of Numerical Examples 1 to 3 is described. Herein, a surface number is a number of an optical surface counted in order from the object side of the respective optical members (mirror M and plurality of lenses provided in the optical system L) of the imaging optical system 2. R represents a curvature radius of each optical surface of each optical member of the imaging optical system 2. D represents a surface interval between the i-th surface and the (i+1)th surface of each optical member of the imaging optical system 2. $N_d$ represents a refractive index in the d-line between the i-th surface and the (i+1)th surface of each optical member of the imaging optical system 2.

Further, an Abbe number $\upsilon_d$ is obtained by Equation (4) described below.

$$\nu_d = \frac{N_d - 1}{N_F - N_C} \quad (4)$$

In the above-mentioned expression, $N_F$ and $N_C$ represent refractive indices in an F-line and a C-line, respectively, between the i-th surface and the (i+1)th surface of each optical member of the imaging optical system 2.

Further, a suffix "*" means that the optical surface having a surface number with the suffix "*" is an aspherical surface, and AP represents an aperture stop.

Further, assuming that a distance from the optical axis in a direction perpendicular to the optical axis is r, when a surface position in the optical axis direction at the distance r is set as A(r), each optical aspherical surface is expressed by Equation (5) described below.

$$A(r) = \frac{r^2/R}{1 + \sqrt{1 - (1+K)r^2/R^2}} + C_4 r^4 + C_6 r^6 + C_8 r^8 + C_{10} r^{10} C_{12} r^{12} \quad (5)$$

Note that, in aspherical coefficients K and $C_i$ (i=4, 6, 8, 10, and 12), "E-N" indicates "$\times 10^{-N}$".

Further, f represents a focal length of the imaging optical system 2, Fno represents the F-number of the imaging optical system 2, and ω represents, as described above, the maximum value of the angle formed between the light flux entering the image plane IMG and the normal to the image plane IMG within the imaging region of the image plane IMG.

(Numerical Example 1)

| Surface number | Optical member | R | D | $N_d$ | $v_d$ |
|---|---|---|---|---|---|
| 1* | M | 88.37 | 173.97 | | |
| 2* | L701 | −79.50 | 2.50 | 1.583 | 59.38 |
| 3* | | ∞ | 0.70 | 1 | |
| 4 | L702 | 36.42 | 7.00 | 1.654 | 39.70 |
| 5 | | 103.24 | 4.40 | 1 | |
| 6 | L703 | −97.81 | 4.04 | 1.762 | 40.10 |
| 7 | | 71.47 | 4.81 | 1 | |
| 8 | L704 | −110.99 | 7.03 | 1.729 | 54.68 |
| 9 | | −46.83 | 3.05 | 1 | |
| 10 | L705 | 91.75 | 6.18 | 1.595 | 67.74 |
| 11 | L706 | −94.26 | 3.64 | 1.702 | 41.24 |
| 12 | | 514.74 | 6.04 | 1 | |
| 13 | L707 | 27.97 | 5.26 | 1.595 | 67.74 |
| 14 | | −135.24 | 2.68 | 1 | |
| AP | | ∞ | 6.00 | 1 | |
| 16 | L708 | −25.42 | 2.04 | 1.883 | 40.76 |
| 17 | L709 | 360.05 | 6.63 | 1.595 | 67.74 |
| 18 | | −27.81 | 2.00 | 1 | |
| 19 | L710 | −51.90 | 3.41 | 1.816 | 46.62 |
| 20 | | −607.15 | 2.08 | 1 | |
| 21* | L711 | −182.25 | 5.22 | 1.583 | 59.38 |
| 22 | | −39.06 | 0.70 | 1 | |
| 23 | L712 | 62.74 | 8.50 | 1.497 | 81.54 |
| 24 | | −123.57 | | 1 | |

| K | C4 | C6 | C8 | C10 | C12 |
|---|---|---|---|---|---|
| | | Surface number: 1 | | | |
| −9.25E−01 | −6.10E−08 | 8.82E−12 | −4.41E−16 | 1.37E−20 | 0.00E+00 |
| | | Surface number: 2 | | | |
| −1.24E+00 | 8.93E−07 | −2.18E−09 | 8.36E−12 | −3.11E−15 | −9.36E−19 |
| | | Surface number: 3 | | | |
| 0.00E+00 | −1.39E−07 | −7.30E−10 | 8.53E−12 | −1.63E−15 | 0.00E+00 |
| | | Surface number: 21 | | | |
| −5.29E−01 | −2.65E−06 | −1.61E−08 | 3.69E−11 | −9.43E−14 | 0.00E+00 |

| | |
|---|---|
| f | 13.59 |
| Fno | 8.0 |
| TD | 303.87 |
| IML | 28.81 |
| ω | 16.0 |

(Numerical Example 2)

| Surface number | Optical member | R | D | $N_d$ | $v_d$ |
|---|---|---|---|---|---|
| 1* | M | 105.95 | 197.28 | | |
| 2* | L801 | −102.87 | 1.91 | 1.516 | 64.14 |
| 3* | | 1,242.82 | 0.63 | 1 | |
| 4 | L802 | 80.20 | 4.64 | 1.847 | 23.78 |
| 5 | | 124.87 | 2.66 | 1 | |
| 6 | L803 | −108.08 | 1.71 | 1.800 | 29.84 |
| 7 | | 108.23 | 3.50 | 1 | |
| 8 | L804 | −221.78 | 7.03 | 1.697 | 55.53 |
| 9 | L805 | −100.71 | 3.73 | 1.850 | 32.27 |
| 10 | | −58.34 | 0.20 | 1 | |
| 11 | L806 | 64.84 | 5.94 | 1.595 | 67.74 |
| 12 | L807 | −54.78 | 1.80 | 1.670 | 39.30 |
| 13 | | 414.68 | 7.85 | 1 | |
| 14 | L808 | 30.80 | 6.37 | 1.595 | 67.74 |
| 15 | | −149.17 | 2.00 | 1 | |
| AP | | ∞ | 5.96 | 1 | |
| 17 | L109 | −28.77 | 2.54 | 1.651 | 56.16 |

-continued

| | | | | | |
|---|---|---|---|---|---|
| 18 | | −63.20 | 0.77 | 1 | |
| 19* | L810 | −437.33 | 3.77 | 1.516 | 64.14 |
| 20 | | −42.27 | 3.04 | 1 | |
| 21 | L811 | −32.23 | 1.01 | 1.883 | 40.76 |
| 22 | L812 | 104.36 | 6.80 | 1.522 | 59.84 |
| 23 | | −114.79 | 0.70 | 1 | |
| 24* | L813 | 257.45 | 4.31 | 1.516 | 64.14 |
| 25 | | −101.66 | 0.80 | 1 | |
| 26 | L814 | 69.58 | 7.57 | 1.497 | 81.54 |
| 27 | | −62.04 | | 1 | |

| K | C4 | C6 | C8 | C10 | C12 |
|---|---|---|---|---|---|
| Surface number: 1 | | | | | |
| −7.07E−01 | −3.83E−08 | 3.64E−12 | −1.38E−16 | 1.36E−21 | 0.00E+00 |
| Surface number: 2 | | | | | |
| −1.00E+01 | 1.71E−06 | 7.23E−09 | −7.82E−12 | −8.17E−15 | 0.00E+00 |
| Surface number: 3 | | | | | |
| −2.97E+00 | 7.36E−07 | 9.48E−09 | −4.89E−12 | −2.49E−14 | 0.00E+00 |
| Surface number: 19 | | | | | |
| −1.30E−01 | 1.92E−05 | 3.98E−08 | −1.98E−09 | 1.51E−11 | 0.00E+00 |
| Surface number: 24 | | | | | |
| −5.22E+00 | −1.59E−05 | −1.91E−08 | 5.11E−11 | −1.71E−13 | 0.00E+00 |

| | | |
|---|---|---|
| | f | 16.75 |
| | Fno | 10.0 |
| | TD | 319.72 |
| | IML | 29.17 |
| | ω | 17.55 |

(Numerical Example 3)

| Surface number | Optical member | R | D | $N_d$ | $v_d$ |
|---|---|---|---|---|---|
| 1* | M | 92.34 | 184.24 | | |
| 2* | L901 | −93.96 | 2.58 | 1.583 | 59.38 |
| 3* | | 936.29 | 1.63 | 1 | |
| 4 | L902 | 84.39 | 5.94 | 1.723 | 37.95 |
| 5 | | −718.78 | 4.70 | 1 | |
| 6 | L903 | −47.44 | 2.98 | 1.720 | 43.69 |
| 7 | | 195.54 | 6.21 | 1 | |
| 8 | L904 | −110.74 | 4.05 | 1.755 | 52.32 |
| 9 | | −47.61 | 11.27 | 1 | |
| 10 | L905 | 63.11 | 5.50 | 1.595 | 67.74 |
| 11 | L906 | −102.08 | 2.72 | 1.596 | 39.24 |
| 12 | | 180.02 | 0.69 | 1 | |
| 13 | L907 | 29.08 | 4.54 | 1.595 | 67.74 |
| 14 | | −112.68 | 2.10 | 1 | |
| AP | | 0.00 | 1.12 | 1 | |
| 16 | L908 | −389.79 | 1.84 | 1.816 | 46.62 |
| 17 | L909 | 36.55 | 7.61 | 1.603 | 65.44 |
| 18 | | −52.33 | 2.00 | 1 | |
| 19 | L910 | −26.21 | 1.70 | 1.816 | 46.62 |
| 20 | L911 | 86.69 | 4.68 | 1.607 | 56.81 |
| 21 | | −73.04 | 1.38 | 1 | |
| 22* | L912 | −149.67 | 3.66 | 1.583 | 59.38 |
| 23 | | −55.07 | 0.80 | 1 | |
| 24 | L913 | 114.18 | 4.63 | 1.497 | 81.54 |
| 25 | | −146.00 | 36.84 | 1 | |

| K | C4 | C6 | C8 | C10 | C12 |
|---|---|---|---|---|---|
| Surface number: 1 | | | | | |
| −9.86E−01 | −5.44E−08 | 7.68E−12 | −3.40E−16 | 9.41E−21 | 0.00E+00 |
| Surface number: 2 | | | | | |
| −2.79E+00 | 1.03E−06 | −3.56E−09 | 7.15E−12 | 1.05E−14 | −1.57E−17 |

-continued

| Surface number: 3 | | | | | |
|---|---|---|---|---|---|
| −8.06E+00 | 1.57E−07 | −1.20E−09 | 1.04E−11 | 2.26E−16 | 0.00E+00 |

| Surface number: 22 | | | | | |
|---|---|---|---|---|---|
| −4.10E−01 | −1.65E−06 | −2.80E−08 | 1.10E−10 | −4.02E−13 | 0.00E+00 |

| | |
|---|---|
| f | 13.22 |
| Fno | 5.6 |
| TD | 305.41 |
| IML | 25.24 |
| ω | 21.3 |

In the following table, values of the respective conditional expressions calculated from numerical data of Numerical Examples 1 to 3 are shown.

| Conditional Expression | Numerical Example 1 | Numerical Example 2 | Numerical Example 3 |
|---|---|---|---|
| TD/IML | 10.547 | 10.962 | 12.100 |
| $Q_{r1}/Q_{r2}$ | −1.25 | −1.69 | −1.10 |
| ω | 16.04 | 17.55 | 21.30 |
| Fno | 8.0 | 10.0 | 5.6 |
| IML | 28.81 | 29.17 | 25.24 |

It is understood from above that the imaging optical system 2 according to any one of Numerical Examples 1 to 3 satisfies Conditional Expressions (1), (2), and (3) that are the features of the present invention.

Further, the Abbe number of a glass material used for the positive lenses L707, L808, and L907 closest to the aperture stop AP of the imaging optical system 2 according to Numerical Examples 1 to 3 is equal to or larger than 60. This allows the imaging optical system 2 to correct an axial chromatic aberration satisfactorily, and conduct the reading with high resolution.

In addition, the Abbe number of a glass material used for the positive lenses L712, L814, and L913 closest to the image plane IMG of the imaging optical system 2 according to Numerical Examples 1 to 3 is equal to or larger than 60. This allows the imaging optical system 2 to correct a lateral chromatic aberration satisfactorily, and conduct the reading with high resolution.

Further, in the imaging optical system 2 according to Numerical Examples 1 to 3, at least one lens that has an aspherical surface on the object side exists among the positive lenses on the image side of the aperture stop AP. Specifically, the at least one lens includes the lens L711 in Numerical Example 1, the lenses L810 and L813 in Numerical Example 2, and the lens L912 in Numerical Example 3. This allows the imaging optical system 2 to correct various aberrations such as a coma and a field curvature in the periphery satisfactorily, and conduct the reading with high resolution.

Further, the mirror M of the imaging optical system 2 according to Numerical Examples 1 to 3 has a rotationally symmetric shape with respect to the optical axis of the optical system L. This facilitates the arrangement of the mirror M, and therefore facilitates the assembly of the imaging optical system 2.

Further, in the imaging optical system 2 according to Numerical Examples 1 to 3, vignetting can be suppressed by appropriately setting an effective diameter of the lens, the curvature radius, an interval between the lenses, and the like. Therefore, reduction in resolution due to vignetting is suppressed, to thereby allow the imaging optical system 2 to conduct the reading with high resolution across the entire reading region.

Exemplary embodiments of the present invention have been described above, but the present invention is not limited to those embodiments, and various changes and modifications can be made within the scope of the gist of the present invention.

For example, in order to allow the imaging optical system to have a more compact size, a folding mirror or the like may be arranged within the optical system.

According to the one embodiment of the present invention, a reading apparatus capable of conducting reading with high resolution even in a compact size even when a large-sized image pickup element is used and an imaging optical system included in the reading apparatus can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-092897, filed Apr. 30, 2015, which is hereby incorporated by reference herein in its entirety.

What is claimed is:

1. A reading apparatus, comprising:
   an image pickup element configured to pick up an image of an object;
   a first optical system comprising at least one reflective surface configured to reflect a light flux from the object, the first optical system being configured to form an intermediate image of the object; and
   a second optical system configured to image the intermediate image onto a light-receiving surface of the image pickup element, wherein:
   the at least one reflective surface comprises a first reflective surface which is closest to the light-receiving surface on an optical path, and which has a positive power; and
   the following condition is satisfied:

$5 \leq TD/IML \leq 20$ where TD represents a maximum distance from the first reflective surface to the light-receiving surface on the optical path, and IML represents a maximum image height of the second optical system.

2. A reading apparatus according to claim 1, wherein the second optical system comprises an optical surface which is closest to the first reflective surface on the optical path, and which is an aspherical surface.

3. A reading apparatus according to claim 1, wherein the second optical system comprises a plurality of lenses.

4. A reading apparatus according to claim 3, wherein the plurality of lenses comprise a negative lens which is closest to the first reflective surface on the optical path, and which is an aspherical lens.

5. A reading apparatus according to claim 4, wherein the following condition is satisfied:

$$-2.0 < Qr_1/Qr_2 < 0$$

where $Qr_1$ represents a maximum value of an aspherical amount of a lens surface of the negative lens on an object side, and $Qr_2$ represents a maximum value of an aspherical amount of a lens surface of the negative lens on an image side.

6. A reading apparatus according to claim 5, wherein the following condition is satisfied:

$$Qr_1 < 0.$$

7. A reading apparatus according to claim 3, wherein:
the second optical system comprises an aperture stop; and
the plurality of lenses comprise a positive lens which is closest to the aperture stop, and which has an Abbe number of equal to or larger than 60.

8. A reading apparatus according to claim 3, wherein the plurality of lenses comprise a positive lens which is closest to the light-receiving surface, and which has an Abbe number of equal to or larger than 60.

9. A reading apparatus according to claim 1, wherein the following condition is satisfied:

$$5° \leq \omega \leq 30°$$

where $\omega$ represents a maximum value of an angle formed between the light flux entering the light-receiving surface and a normal to the light-receiving surface.

10. A reading apparatus according to claim 1, wherein a synthetic F-number of the first optical system and the second optical system on an image side is larger than 4.0.

11. A reading apparatus according to claim 1, wherein the second optical system comprises:
an aperture stop; and
a positive lens which is arranged on an image side of the aperture stop, and which has an aspherical lens surface on an object side.

12. A reading apparatus according to claim 11, wherein the positive lens has an Abbe number of equal to or larger than 60.

13. A reading apparatus according to claim 1, wherein the first reflective surface has a rotationally symmetric shape with respect to an optical axis of the second optical system.

14. A reading apparatus according to claim 1, wherein the maximum image height IML of the second optical system is longer than 14 mm.

15. A reading apparatus according to claim 1, wherein the first optical system includes a mirror including the first reflective surface.

16. A reading apparatus according to claim 1, further comprising a reading surface on which the object is placed.

17. A reading apparatus according to claim 1, wherein the first optical system includes the at least one reflective optical element, and the second optical system includes a plurality of refractive optical elements.

\* \* \* \* \*